United States Patent [19]

Avritt et al.

[11] Patent Number: 4,466,813
[45] Date of Patent: Aug. 21, 1984

[54] PLASTICIZER REMOVAL PROCESS AND SYSTEM

[75] Inventors: Michael D. Avritt; Michael M. Farrow, both of Boulder, Colo.

[73] Assignee: International Business Machines Corporation, Armonk, N.Y.

[21] Appl. No.: 387,718

[22] Filed: Jun. 11, 1982

[51] Int. Cl.$^3$ ............................................. B01D 53/04
[52] U.S. Cl. ........................................ 55/74; 55/387; 55/DIG. 42; 355/3 R
[58] Field of Search ................... 55/74, 387, DIG. 42; 355/3 R, 3 DD

[56] References Cited

U.S. PATENT DOCUMENTS

| | | | |
|---|---|---|---|
| 2,972,554 | 2/1961 | Muskat et al. | 55/DIG. 42 |
| 4,046,939 | 9/1977 | Hart | 55/387 X |
| 4,128,513 | 12/1978 | Errede et al. | 55/387 X |
| 4,143,118 | 3/1979 | Laing | 355/3 R X |
| 4,202,618 | 5/1980 | Waschk et al. | 355/3 FU |
| 4,203,734 | 5/1980 | Winter et al. | 55/62 X |
| 4,377,334 | 3/1983 | Nishikawa | 355/3 DD |

OTHER PUBLICATIONS

European Application No. 0038224, published 10/1981.
Brown et al., *IBM Technical Disclosure Bulletin*, vol. 23, No. 12, 5/1981, pp. 5620–5621, "Integral Ozone Filtration System".
Lynch, *IBM Technical Disclosure Bulletin*, vol. 24, No. 6, 11/1981, p. 2816, "Gettering Device for Vacuum Deposition".
Laing et al., *Xerox Disclosure Journal*, vol. 6, No. 5, 9/10-1981, "Filtering Devices for use in Copying Machines".

*Primary Examiner*—Robert H. Spitzer
*Attorney, Agent, or Firm*—Joscelyn G. Cockburn; Earl C. Hancock

[57] ABSTRACT

The contamination of machine components by a plasticizer such as dioctyl phthalate is controlled by placing a plasticizer absorbing/adsorbing member in the migration path of the plasticizer. The plasticizer may migrate with the airflow (airborne contamination) in a machine or through direct contact (conductive). The airborne contaminants such as dioctyl phthalate (DOP) tend to migrate from relatively warm heat producing components to cooler components of a machine. The airborne contaminants are trapped by an active DOP absorber disposed in the airflow path between the components. In a convenience copier, the airborne contaminants tend to condense on the photoconductor's surface. To this end, the active absorber/adsorber is placed in the airflow stream between various heat generating electrical components and the photoconductor's surface. In a connector, the contamination results from direct contact and is controlled by placing a plasticizer migration barrier in the migration path of the plasticizer.

8 Claims, 2 Drawing Figures

PLASTICIZER REMOVAL PROCESS AND SYSTEM

BACKGROUND OF THE INVENTION

1. Field of the Invention

The present invention relates to the control of airborne contamination in a machine and, more particularly, to the control of airborne contaminants so that certain components in a machine are not contaminated by contaminants generated by other components of the same machine.

2. Prior Art

Electrical machines such as copiers, tend to generate and release undesirable airborne elements. These elements tend to contaminate machine components and the atmosphere. It is believed that the airborne elements are released from electrical components. The release is believed to be more pronounced when the temperature of the components is elevated.

Because some types of airborne elements tend to be injurious to one's health if inhaled, the prior art tends to control entry of the airborne elements into the atmosphere. Ozone is one of the airborne elements which is hazardous to health. It is believed that this hazardous gas is generated from high voltage and heat generating components and heat generating processes. The prior art attempts to control ozone by limiting the percentage and/or concentration of ozone emitted from a machine into the atmosphere. This is done by placing a filter which absorbs and/or decomposes ozone from the air prior to exhausting it into the atmosphere.

By way of example, U.S. Pat. No. 4,202,618 describes an apparatus for controlling the amount of ozone which is outputted from a copier into the atmosphere. The ozone is generated by a flash lamp which fuses microscopic toner onto a copy sheet. A first cooling air passage is disposed about the flash lamp. The air passage carries a cooling airstream of low volumetric flow rate and interconnects the flash lamp with the ambient atmosphere. An activated carbon filter is placed in the first cooling air passage downstream from the flash lamp. A second cooling airstream of high volumetric flow rate is disposed so that air exiting from the filter mixes with the air in the second cooling stream. As such, the air carrying the ozone is diluted prior to actual discharge from the copier.

*IBM Technical Disclosure Bulletin* Vol. 23, No. 12, May 1981 (pages 5620-5621) shows an ozone-removing charcoal filter mounted inside a photoconductor drum. Ozone which is generated from the photoconductor is extracted by creating an airflow through the charcoal filter.

*IBM Technical Disclosure Bulletin* Vol. 24, No. 6, November 1981 (page 2816) describes the use of an expanded metal foam to getter unwanted gases from the inert gases used in vacuum deposition processes.

European patent application, Ser. No. 81301706.8, filed Apr. 16, 1981, published Oct. 21, 1981 and *Xerox Disclosure Journal* Vol. 6. No. 5, September/October 1981 (pg. 217) describe specific types of ozone filters, all of which are suitable to filter ozone from an airstream.

Although the prior art attempts to control the discharge of ozone into the ambient atmosphere, it does not address the problem of airborne elements contaminating other components of a machine. It is this type of problem that the present invention addresses. For purposes of discussion, it will be assumed that the machine is a copier. One type of airborne contaminant is dioctyl phthalate, hereinafter called DOP. It is believed that DOP is present in most types of soft vinyl wire insulation. At elevated temperatures, DOP can be expelled from those parts. The DOP moves with the convective or driven airflow to condense on cooler components of the machine.

In the case of a copier, the DOP condenses on the photoconductor and forms a source of contamination. The condensation usually occurs in the region of the photoconductor relative to the transfer/paper separator corona. The deposit plasticizes the toner and causes it to adhere more tenaciously to the photoconductor. As such, cleaning of the toner from the photoconductor is much more difficult. Moreover, in those copiers which use a cleaning blade to remove residual toner, the toner forms a line of deposit on the photoconductor. The line runs parallel to the blade. The build-up of toner on the photoconductor reduces the quality of the copies.

It is worthwhile noting that the invention to be described hereinafter will protect some machine components from plasticizer. The plasticizer is usually generated by other machine components. DOP is only one type of plasticizer.

SUMMARY OF THE INVENTION

It is therefore the general object of the present invention to provide an apparatus and method which protects the components of a machine from deleterious airborne contaminants.

It is a specific objective of the present invention to protect the components of a machine from contamination due to plasticizer.

It is a more specific objective of the present invention to protect the photoconductor of a copier from DOP contamination.

It is yet another objective of the present invention to protect the pins of a connector from contamination due to plasticizer.

The objectives of the present invention are achieved by placing a foam material to intercept airflow moving from plasticizer generating components to the photoconductor. The foam material is characterized by its ability to entrap and adsorb and/or absorb the plasticizer.

In another embodiment of the invention, the pins of a connector are protected by placing a relatively thin layer of plasticizer intercepting foam between the section of the connector which produces the plasticizer and the section of the conductor which is contaminated by the plasticizer.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

The present invention to be described hereinafter, finds use in any electrical machine where plasticizer such as DOP is a source of contamination. The present invention works well in an electrophotographic copier and, as such, will be described in that environment. However, this description should not be construed as a limitation on the scope of the present invention, since it is the intent that the concept of this invention can be used in any environment to protect relatively cool components from plasticizer contamination. Usually the plasticizer contamination is generated from warmer components.

By way of example, the invention may be used to protect the windshield of vehicles from plasticizer contamination. The contamination may form a film on the glass. The source of the contamination may be vinyl upholstery, dashboard covering, etc.

For purposes of description, DOP will be the main contaminant. However, this should not be construed as a limitation on the scope of the present invention since the present invention is aimed at protecting components from contamination due to plasticizer.

Active filters fabricated so as to absorb/adsorb DOP or any other type of plasticizer 10, 11, 12 and 13 are placed in the airflow path between the photoconductor drum 16 and various electrical components of the copier. Airborne contaminants, such as DOP, which are released by certain types of components when heated and which tend to condense on the photoconductor, are entrapped and/or neutralized as they pass through the filters. This DOP is believed to be released by some electrical components in the copier, particularly in early usage of the copier until thermal stability is reached.

The active adsorber is often referred to as a getter. As is used in this application, getter means a substance or material that removes traces of a particular gas. Conceptually it functions in a manner similar to the oxygen "getter" used in the well-known vacuum tubes during manufacturing to eliminate all traces of oxygen inside the envelope. The removal of oxygen prevents oxidation of the filaments in the tube.

Figure 1:
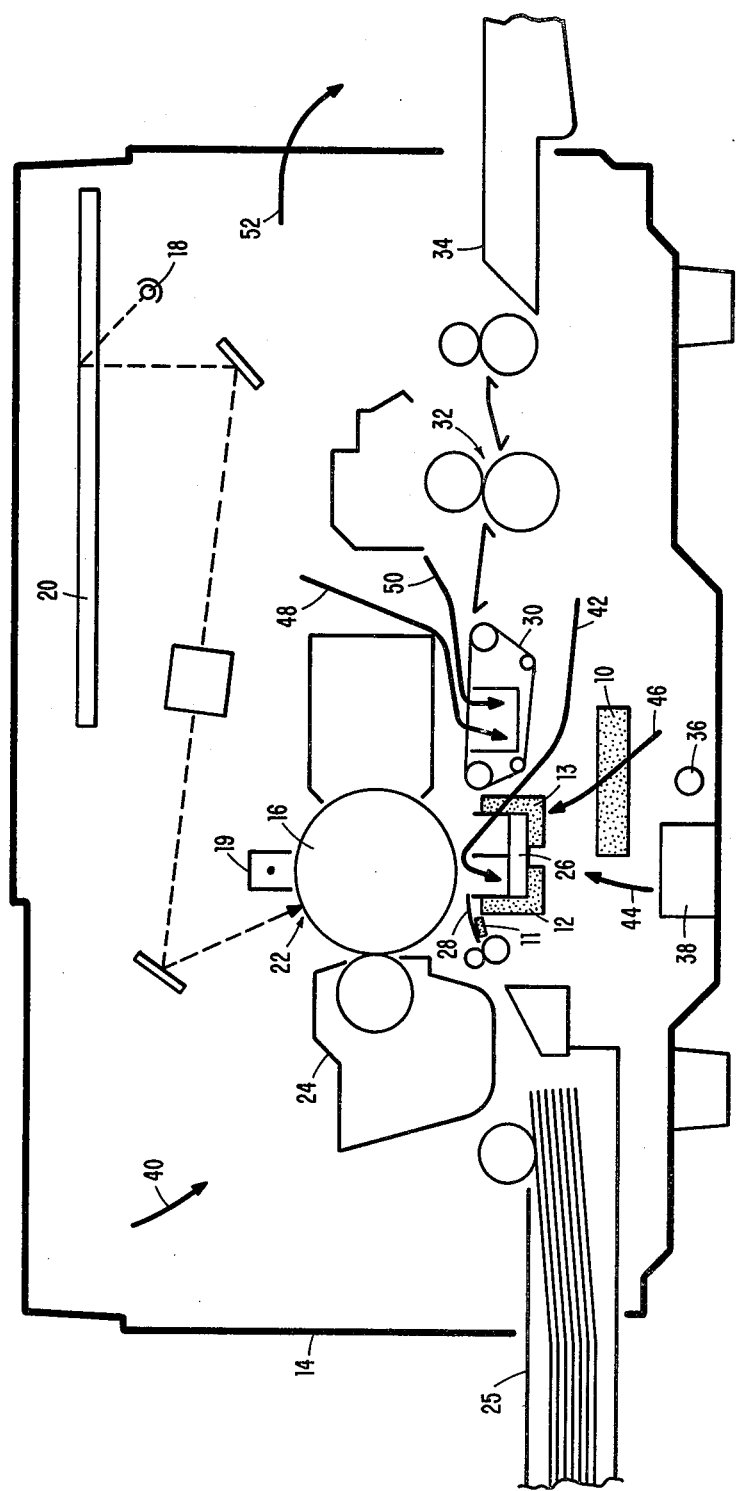
FIG. 1 shows a schematic view of a copier with the plasticizer absorber/adsorber disposed in appropriate airflow paths.

With reference to FIG. 1, numeral 14 denotes the housing of an electrostatic copier. A plurality of copier components are mounted inside the housing. The components coact to produce a series of processing steps which collectively form the well-known electrophotographic process. Since this process is well known, details of the components and/or each individual step will not be described. Suffice it to say the description will be limited to that part of the process which is necessary for one to understand the present invention.

The photoconductor drum 16 is journaled for rotation in a counterclockwise direction in the frame of the housing. As the photoconductor rotates, a charge corona 19 deposits a negative charge on the surface of the photoconductor (PC) drum. A high intensity lamp 18 generates a light beam which illuminates the document glass of the copier. A carriage assembly 20 moves (that is transports) a document (not shown) over the high intensity lamp 18. The reflected light from the document is passed to the PC drum using two mirrors, a lens and an aperture blade. Because the photoconductor is sensitive to light, the light reflecting from the document being copied, discharges the photoconductor and produces a latent image on the photoconductor surface at station 22.

The latent image on the photoconductor passes by the developer station 24 where a magnetic brush transfers microscopic toner particles to the latent image making it into a developed and visible image. The developed image is next transferred to a sheet of paper by the transfer and separation corona 26. Paper is supplied from paper station 25 and is guided onto the photoconductor by guide means 28. A separate corona disposed next to the transfer corona detaches the sheet from the photoconductor drum. The detached sheet with the unfused image, is transferred by a vacuum transport means 30 to the fusing station 32. It should be noted that the vacuum transport means 30 is fitted with an exhaust fan (not shown) which pulls heated air through the copier to ambient atmosphere. The fusing station 32 includes a back-up roll and a hot roll that fuse the toner to the paper by heat and pressure as the paper is transported through the hot roll and its associated back-up roll. The paper with the fused image is then ejected into exit tray 34.

So far, this description is directed to conventional elements and conventional copying processes. The balance of this specification will describe the device and the specific problem which the present invention seeks to cure. As stated previously, the function of the present inventon is to protect the photoconductor 16 so that deleterious DOP contaminants do not condense on the photoconductor. It is believed that DOP is released in the copier when the temperature of certain copier components, such as wire bundle or connector insulation 36, is elevated. The heat-producing elements in this copier are identified by numerals 18, 32 and 38. These internal heat-producing elements increase the internal temperature of the copier and, as such, DOP contaminants are released from certain copier components such as the wire bundle. The DOP contaminants tend to migrate with the airflow or airstreams in the copier. These airstreams are generally created to cool the internal components of the copier. As can be seen in the figure, the arrows 40, 42, 44, 46, 48, 50 and 52 show the airflow path in the machine. It should be noted that these airflow paths are merely exemplary and vary in different types of machines.

Airflow paths such as 40, 48, 50 and 52 which do not appear to contact the surface of the photoconductor, do not create a problem. However, those airflow paths which come in contact or in the vicinity of the photoconductor 16, tend to carry the DOP which coacts with the photoconductor surface and prevent the photoconductor from performing satisfactorily. In order to prevent this unsatisfactory result, a getter means or DOP filter means identified by numerals 10, 11, 12 and 13 is disposed in the airflow streams which is directed towards the photoconductor. It should be noted that if other airflow streams are directed towards the photoconductor surface, the getter should be placed in those streams. It is worthwhile noting that the airstreams can be formed by convectional means (i.e. hot air rising) or by active means such as a fan, etc. The gist of the invention is to determine the migration path for the DOP and to place a getter means within the migration path. The getter material must be capable of adsorbing DOP.

The physico-chemical requirements of such a getter implies several characteristics. Each of these characteristics will now be described:

1. The surface-free energy ($\Delta G_{surface}$) of the getter must be such that the plasticizer spreads over the surface and does not bead up. This characteristic implies a material with high surface energy relative to the plasticizer.
2. The thermodynamics of the plasticizer adsorption process must be such that adsorption will occur even at slightly elevated temperatures: where $\Delta H_{surface} < T\Delta S_{condensation}$, T=T ambient. It is worthwhile noting that for a process to occur spontaneously, then:

$\Delta G$ must be negative (i.e. free energy negative),
   $\Delta H$, enthalpy of a process (heat flow can be + or −),
   T, temperature (Kelvin always +),
   $\Delta S$, entropy of a process (+ or −), and
   $\Delta G = \Delta H - T\Delta S$.
3. To prevent re-emission of DOP during period of higher temperatures, that is extended running, the material should incorporate DOP into the matrix. For this process, $T\Delta S_{mixing}$ will be negative (if the getter can be plasticized) and $\Delta H_{plasticization}$ may or may not be negative.
4. In order for $T\Delta S_{mixing}$ to be not kinetically limited, the glass transition temperature of the getter should be low (much below ambient).

It is believed that the above requirements are best met with a getter fabricated from either a neoprene or nitrile plastic material. In the preferred embodiment of this invention, the getter for DOP is optimized in an open cell foam configuration, Ensolite ® or neoprene foam, for example. It should be noted that Ensolite ® is a registered trademark of Uniroyal. The foam configuration allows ease of installation and maximizes surface area to volume/mass.

A satisfactory DOP adsorber can be fabricated using the process to be described hereinafter. This process reproduces a high-density, open cell, vinylnitrile sponge which is formed of the described material in order to render the sponge adsorptive of dioctyl phthalate (DOP) and resistant to ozone.

The following formulation is mixed, using a rubber mill. It is then compression-molded into a desired shape, and cured for about ten minutes at about 325° F., followed by postcuring for about fifteen minutes at about 250° F. The resulting polymer-matrix sponge has a density of about 30 pounds per cubic foot and has from 80 to 100 open cellular-structure pores per surface square inch.

| | | |
|---|---|---|
| (a) PARACRIL OZO (a 70/30 blend of nitrile rubber and polyvinyl chloride) grams | | 100 |
| (b) POLYDISPERSION A (Z-CN)D-85 (85% zinc oxide in a polymeric binder) | | 5.5 |
| Stearic acid | | 0.5 |
| (c) KENMIX ZDEC (a 70% paste dispersion of zinc diethyldithiocarbonate) | | 0.6 |
| (b) POLYDISPERSION VMD-75 (75% 2-mercaptobenzo-thiazole in polymeric binder) | | 0.6 |
| (d) SPIDER sulfur (sulfur) | | 1.4 |
| (a) BLE 25 (a high temperature reaction product of diphenylamine and acetone) | | 2.0 |
| (b) POLYDISPERSION V(DOTG)D-70 (70% di-o-tolylguani-dine in polymeric binder) | | 0.6 |
| (e) A.C. POLYETHYLENE 617A (low molecular weight polyethylene) | | 3.0 |
| (b) POLYDISPERSION T(AZO)1-D75 (75% azodicarbonamide in a polymeric binder) | | 27.0 |
| (b) POLYDISPERSION T(754)D-75 (75% azodicarbonamide in a polymeric binder) | | 15.0 |

-continued

| | |
|---|---|
| (f) HI-SIL 215 (precipitated hydrated amorphous silica) | 15.5 |
| (b) POLYDISPERSION S(UR)-75 (75% urea in a polymeric binder) | 2.0 |

It is believed that some of the above chemicals are trademarks and the below list identifies the trademark owners.
(a) A trademark of Uniroyal Chemical Co.
(b) A trademark of Wyrough & Loser Co.
(c) A trademark of Kenrich Petrochemicals, Inc.
(d) A trademark of Olin Mathieson Chemical Corp.
(e) A trademark of Allied Chemical Corp.
(f) A trademark of P.P.G. Industries In one embodiment of this invention, the DOP absorber/adsorber is formed into strips 11½" and 3/16" wide and ⅛" thick. The strips of foam material were fastened to double-stick adhesive tape and the tape was mounted to the corona housing 26 and to the guide plate 28. The strip of foam material 10 is mounted by appropriate holder (not shown) and attached to the housing of the copier. It is worthwhile noting that various means and methods can be used to mount the DOP getter without departing from the scope of the present invention.

In summary, one can prevent DOP and other deleterious airborne contaminants from depositing on the photoconductor and other components of a machine by performing the following steps:
   (a) Identify the migrating path between components which generate DOP and components which are susceptible to DOP comtamination; and
   (b) Placing DOP getter within the migratory path.

Figure 2:
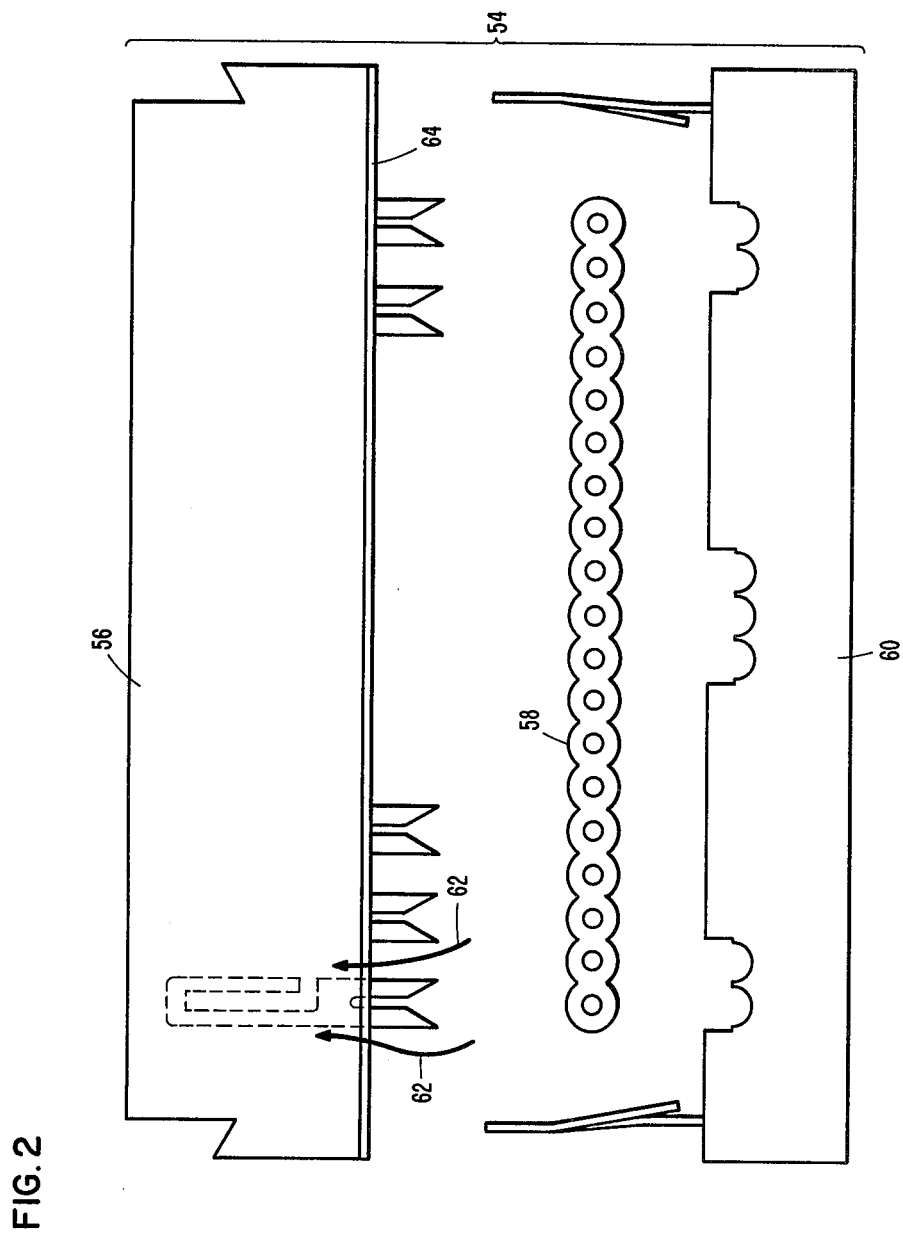
FIG. 2 shows a schematic view of a connector having a layer of plasticizer absorbing/adsorbing material.

FIG. 2 shows a schematic of an alternate embodiment of the present invention. The schematic shows a connector 54 comprising a connector body identified by numeral 56 and a cable identified by numeral 58. A back-up member 60 is a receptacle for receiving the penetrating pins. The connector body includes a housing member and a plurality of penetrating pins connected to female connector pins. The female connector pins are anchored in the housing member. The connector assembly may be of the ribbon type cable with vinyl insulation. Each of the wire conductors in the cable terminates in a conductor block. In operation the penetration pins are fitted into the wire conductor to form a solid electrical contact.

It is believed that plasticizer from the vinyl insulation and from inside the connector housing travels along the plasticizer migration path identified by numeral 62 to contaminate the penetrating pin and/or the female connector pin. The contamination degrades the electrical performance of the connector. A thin layer 64 of the above-identified getter material is deposited on the connector body. As such, all migrating plasticizers are adsorbed prior to contacting and contaminating the critical electrical contact in the connector body. In the preferred embodiment of this invention, the layer was within the range of 5 mils to 10 mils thick.

In summary, the action of the plasticizer migration barrier is to intercept any plasticizer migrating along the metal conductor/penetrator pin to the vicinity of the critical electrical contacts in the connector body. Furthermore, the barrier will absorb the plasticizer and preferentially incorporate the material onto its molecular structure, preventing further migration along the metal. The barrier could conveniently be laid along the cable prior to assembly of the connector with the pin penetration sequence being plasticizer migration barrier, insulation, wire, insulation and finally into the receiver. It should be noted that although a particular type of connector is described, this should not be construed as a limitation on the scope of the present invention, since it is within the skill of the art to apply the teaching of this invention to other types of connectors.

While the invention has been particularly shown and described with reference to a preferred embodiment thereof, it will be understood by those skilled in the art that various changes in form and details may be made therein without departing from the spirit and scope of the invention.

What is claimed is:

1. In a copier wherein airflow within the copier housing is directed at least in part along a path from at least one internal copier component to the copier photoconductor wherein said component releases into the airflow path contaminants with respect to the copier photoconductor, an improvement to prevent said airborne contaminants from contaminating said photoconductor comprising:

air permeable means operable to entrap said contaminants having an ability to contaminate said photoconductor by at least partially preventing normal deposition and removal of toner on said photoconductor; and means mounting said entrapping means in said airflow path for intercepting said contaminants before the air engages the photoconductor.

2. The improvement recited in claim 1 wherein the air permeable means includes a material suitable to adsorb DOP from the air.

3. The improvement of claim 2 wherein the material includes a foam configuration formulated from a group of material consisting of neoprene or vinyl nitrile plastic.

4. The improvement recited in claim 1 wherein the air permeable means includes a high density open celled sponge material and means retained in said sponge material to entrap the DOP.

5. The improvement of claim 4 wherein the means to entrap the DOP includes vinyl nitrile plastic.

6. The improvement in accordance with claim 1 wherein said entrapping means includes an open mesh matrix and means retained in said matrix for neutralizing said airborne elements which contaminate said photoconductor.

7. The improvement in accordance with claim 6 wherein said neutralizing means includes means for adsorbing contaminants which plasticize toner on the photoconductor surface.

8. In a method for protecting a first member from DOP and from the tendency of DOP to migrate from a second member which contains DOP to said first member, and thereby contaminate said first member, the steps comprising composing a getter of nitrile rubber formulated without the DOP plasticizer which is conventionally placed in nitrile rubber, such that said getter has an affinity for DOP, and placing said DOP getter in the path of migration of DOP from said first to said second member to thereby absorb the DOP prior to its reaching said first member.

* * * * *